United States Patent
Dubina et al.

(10) Patent No.: US 9,901,171 B1
(45) Date of Patent: Feb. 27, 2018

(54) TIMING BAR PIN

(71) Applicant: Electrolux Home Products, Inc., Charlotte, NC (US)

(72) Inventors: Paul Dubina, Anderson, SC (US); Ricky Burgan, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 15/335,717

(22) Filed: Oct. 27, 2016

(51) Int. Cl.
```
A47B 88/04    (2006.01)
A47B 88/14    (2006.01)
F16H 19/04    (2006.01)
F16H 57/00    (2012.01)
F25D 25/02    (2006.01)
F25D 23/02    (2006.01)
```

(52) U.S. Cl.
CPC ............ *A47B 88/14* (2013.01); *A47B 88/044* (2013.01); *F16H 19/04* (2013.01); *F16H 57/0025* (2013.01); *F25D 23/021* (2013.01); *F25D 25/025* (2013.01); *A47B 2210/0048* (2013.01); *A47B 2210/0078* (2013.01); *A47B 2210/175* (2013.01)

(58) Field of Classification Search
CPC ..... A47B 88/14; A47B 88/044; F25D 23/021; F25D 23/025; F16H 19/04; F16H 57/0025
USPC .................. 312/330.1, 331, 334.1, 402, 404
See application file for complete search history.

(56) References Cited

U.S. PATENT DOCUMENTS

| | | | | |
|---|---|---|---|---|
| 327,104 | A * | 9/1885 | Perry ................... | A47B 88/10 312/331 |
| 591,134 | A * | 10/1897 | Howard ............... | A47B 88/493 312/331 |
| 7,677,125 | B2 * | 3/2010 | Rotter .................. | F25D 25/025 312/331 |
| 8,152,250 | B2 | 4/2012 | Aguilar Ante et al. | |
| 8,152,254 | B2 | 4/2012 | Kim | |
| 8,360,539 | B2 | 1/2013 | Brown et al. | |
| 8,366,215 | B2 * | 2/2013 | Chen .................... | A47B 88/487 312/331 |
| 8,408,663 | B2 | 4/2013 | Chellappan et al. | |
| 8,562,087 | B2 * | 10/2013 | Eom ..................... | F25D 25/025 312/319.5 |
| 9,016,813 | B2 | 4/2015 | Moody et al. | |
| 2008/0054771 | A1 * | 3/2008 | Brunnmayr ........... | E05D 3/14 312/323 |
| 2011/0210655 | A1 * | 9/2011 | Brown .................. | A47B 88/40 312/334.8 |

(Continued)

*Primary Examiner* — James O Hansen
(74) *Attorney, Agent, or Firm* — Pearne & Gordon LLP

(57) ABSTRACT

A rack-and-pinion mechanism for a drawer assembly of an enclosure includes first and second racks and first and second pinions. The pinions are engaged with the racks via pinion teeth and rack teeth. The pinions are coaxially aligned and rotatable about a rotational axis that translates as the pinions are rotated and translate along the racks. The rack-and-pinion mechanism further includes a timing bar having a first end coupled to the first pinion and a second end coupled to the second pinion. A first pin is inserted into at least one of the first pinion and the first end of the timing bar. A second pin is inserted into at least one of the second pinion and the second end of the timing bar. The pins are configured to substantially inhibit translational movement of the timing bar relative to the pinions along the rotational axis.

5 Claims, 8 Drawing Sheets

(56) References Cited

U.S. PATENT DOCUMENTS

2013/0093306 A1\* 4/2013 Shin ................. F25D 23/021
  312/404
2013/0249367 A1 9/2013 Chen
2013/0270987 A1\* 10/2013 Kelly ................. A47B 88/483
  312/331

\* cited by examiner

TIMING BAR PIN

FIELD

The present disclosure relates to a drawer assembly for a cabinet such as a refrigerator and, more particularly, to a rack-and-pinion mechanism of the drawer assembly.

BACKGROUND

Certain cabinets are built with drawers that are opened and closed through a rack-and-pinion mechanism. Specifically, a first rack and a second rack are provided on opposite sides of the drawer. A first pinion and a second pinion are further provided that rotate respectively along the first rack and second rack as the drawer moves in and out of the cabinet. The pinions and racks engage (e.g., mesh) with each other to help the drawer open and close in a controlled manner and along straight lines. Moreover, a timing bar may further connect the pinions to synchronize rotation of the pinions. There is a need for a way to secure the timing bar to the pinions in a manner that is simple and does not require the use of a tool.

SUMMARY

In accordance with a first aspect, a rack-and-pinion mechanism for a drawer assembly of an enclosure includes a first rack and a second rack, and rack teeth provided longitudinally along each of the first rack and second rack. The rack-and-pinion mechanism further includes a first pinion and a second pinion that are respectively engaged with the rack teeth of the first rack and second rack via pinion teeth provided circumferentially around the first pinion and second pinion. The first pinion and second pinion are coaxially aligned and rotatable about a rotational axis that translates as the first pinion and second pinion are rotated and translate along the first rack and second rack. The rack-and-pinion mechanism further includes a timing bar having a first end coupled to the first pinion and a second end coupled to the second pinion. The rack-and-pinion mechanism further includes a first pin and a second pin. The first pin is non-threaded and inserted into at least one of the first pinion and the first end of the timing bar. The second pin is non-threaded and inserted into at least one of the second pinion and the second end of the timing bar. The first pin and second pin are configured to substantially inhibit translational movement of the timing bar along the rotational axis, relative to the first pinion and second pinion.

In accordance with a second aspect, a method is provided for assembling a rack-and-pinion mechanism for a drawer assembly. The method includes providing a first rack and a second rack, and rack teeth provided longitudinally along each of the first rack and second rack. The method further includes providing a first pinion and a second pinion that are respectively engaged with the rack teeth of the first rack and second rack via pinion teeth provided circumferentially around the first pinion and second pinion, wherein the first pinion and second pinion are coaxially aligned and rotatable about a rotational axis that translates as the first pinion and second pinion translate along the first rack and second rack. The method further includes providing a timing bar having a first end and a second end and coupling the timing bar to the first pinion and the second pinion. The timing bar is coupled to the first and second pinions by A) slidably coupling the first end of the timing bar with the first pinion and then sliding the timing bar relative to the first pinion along the rotational axis in a first direction away from the second pinion until spacing is provided between the second end of the timing bar and the second pinion along the rotational axis; B) inserting a second pin that is non-threaded into at least one of the second pinion and the second end of the timing bar; C) sliding the timing bar relative to the first pinion along the rotational axis in a second direction toward the second pinion until the second end of the timing bar is slidably coupled with the second pinion; and D) inserting a first pin that is non-threaded into at least one of the first pinion and the first end of the timing bar. Insertion of the first pin and second pin substantially inhibits translational movement of the timing bar along the rotational axis, relative to the first pinion and second pinion along the rotational axis.

BRIEF DESCRIPTION OF THE DRAWINGS

The foregoing and other aspects will become apparent to those skilled in the art to which the present examples relate upon reading the following description with reference to the accompanying drawings, in which.

DETAILED DESCRIPTION

Figure 1:
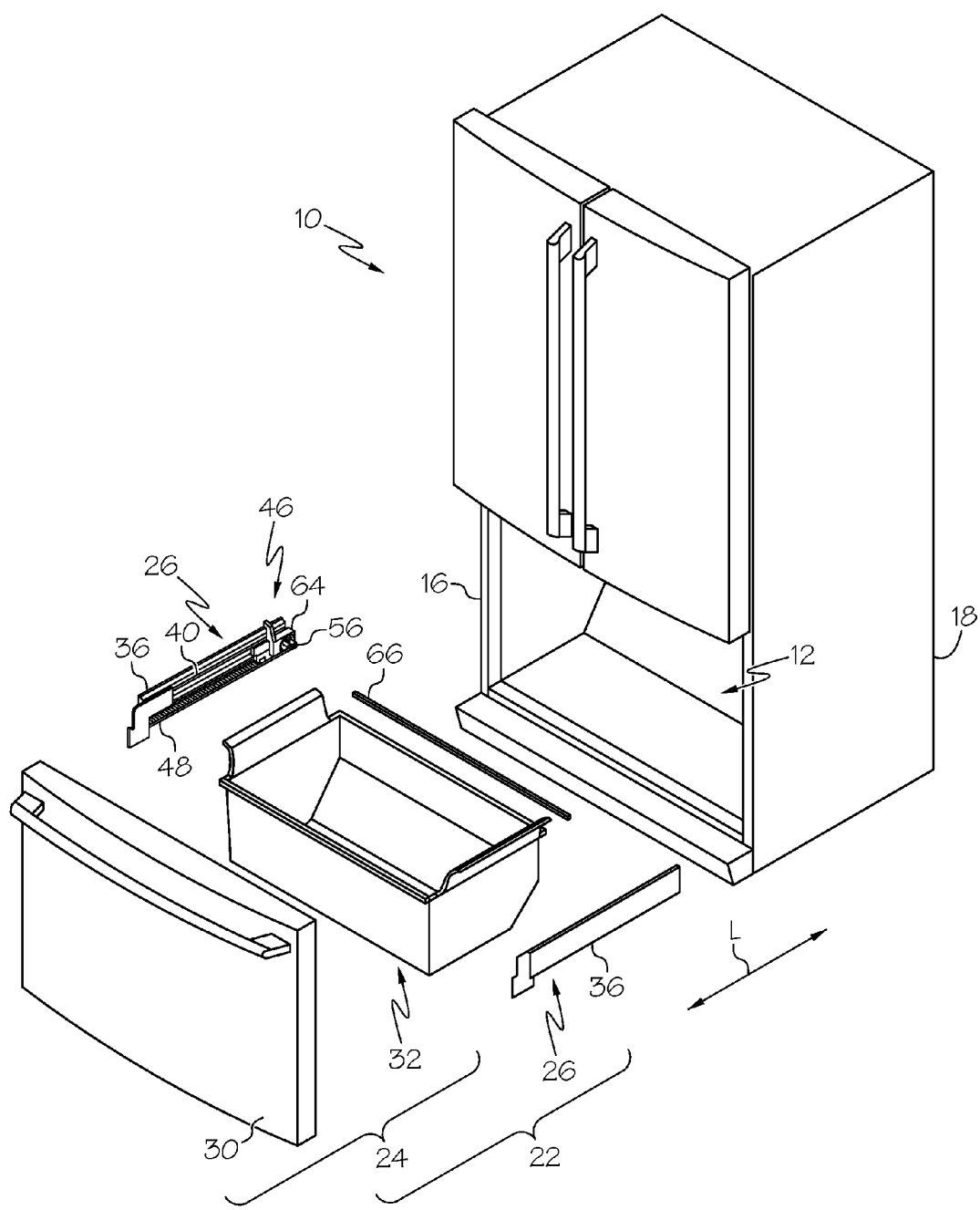
FIG. 1 is an exploded view of a drawer assembly of a cabinet.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Referring now to FIG. 1, a cabinet 10 is shown that defines an enclosure 12. The cabinet 10 in the illustrated embodiment is a refrigerator having a fresh-food compartment and a bottom-mounted freezer compartment, the enclosure 12 corresponding to the freezer compartment. However, the refrigerator in other embodiments can include an alternative arrangement of one or more compartments. The cabinet 10 can be any cabinet-like structure that defines an enclosure and may be characterized as a drawer, a desk, a container, a chest, a safe, a cupboard or the like. The enclosure 12 of the cabinet 10 may provide a particular type of environment for items stored therein and, for example, may be configured to provide refrigeration, heating, sanitization, a vacuum, etc.

The enclosure 12 can be defined at least partially by one or more walls of the cabinet 10 such as, for example, a first sidewall 16 (e.g., a left sidewall) and a second sidewall 18 (e.g., a right sidewall) that are vertically aligned and spaced apart from each other such that the enclosure 12 is defined between the first and second sidewalls 16, 18. Moreover, the cabinet 10 can comprise a drawer assembly 22 that is insertable within the enclosure 12 between the first and second sidewalls 16, 18. The drawer assembly 22 includes a drawer 24 and a pair of motion control mechanisms 26 that are configured to control motion of the drawer 24 in and out of the enclosure 12. In particular, the motion control mechanisms 26 can permit the drawer 24 to be moved between an extended, open position and a retracted, closed position. The motion control mechanisms 26 will control motion of the drawer 24 such that the drawer 24 moves linearly between its open and closed positions. More specifically, the drawer 24 will move in and out of the enclosure 12 along a line of travel L that is substantially parallel to the first and second sidewalls 16, 18.

The drawer 24 may include a door 30 and a basket 32. The basket 32 in the illustrated embodiment comprises box-like shape that occupies a majority of the enclosure 12 when the drawer 24 is in the retracted position. However, the basket 32 may comprise other sizes and shapes and, for example, may comprise a semi-cylindrical shape that occupies less than a majority of the enclosure 12 when the drawer 24 is in the retracted position. The basket 32 can be formed as a monolithic body, such as by injection molding, or can be made of boards, panels or sheets or the basket 32 can be made of wires, cords or the like.

Figure 2:
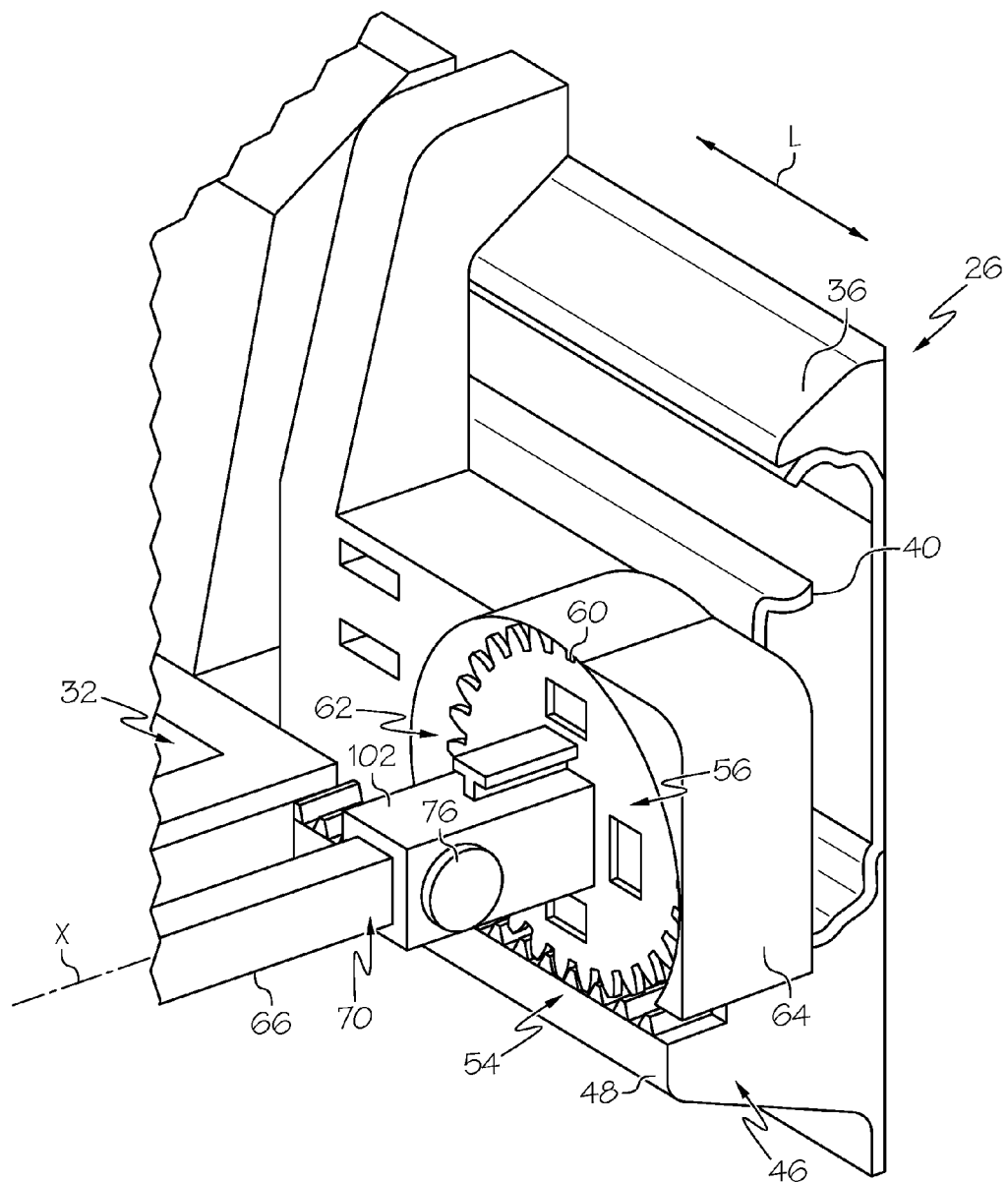
FIG. 2 is a close-up, rear perspective view of a first end of the drawer assembly.
Figure 3:
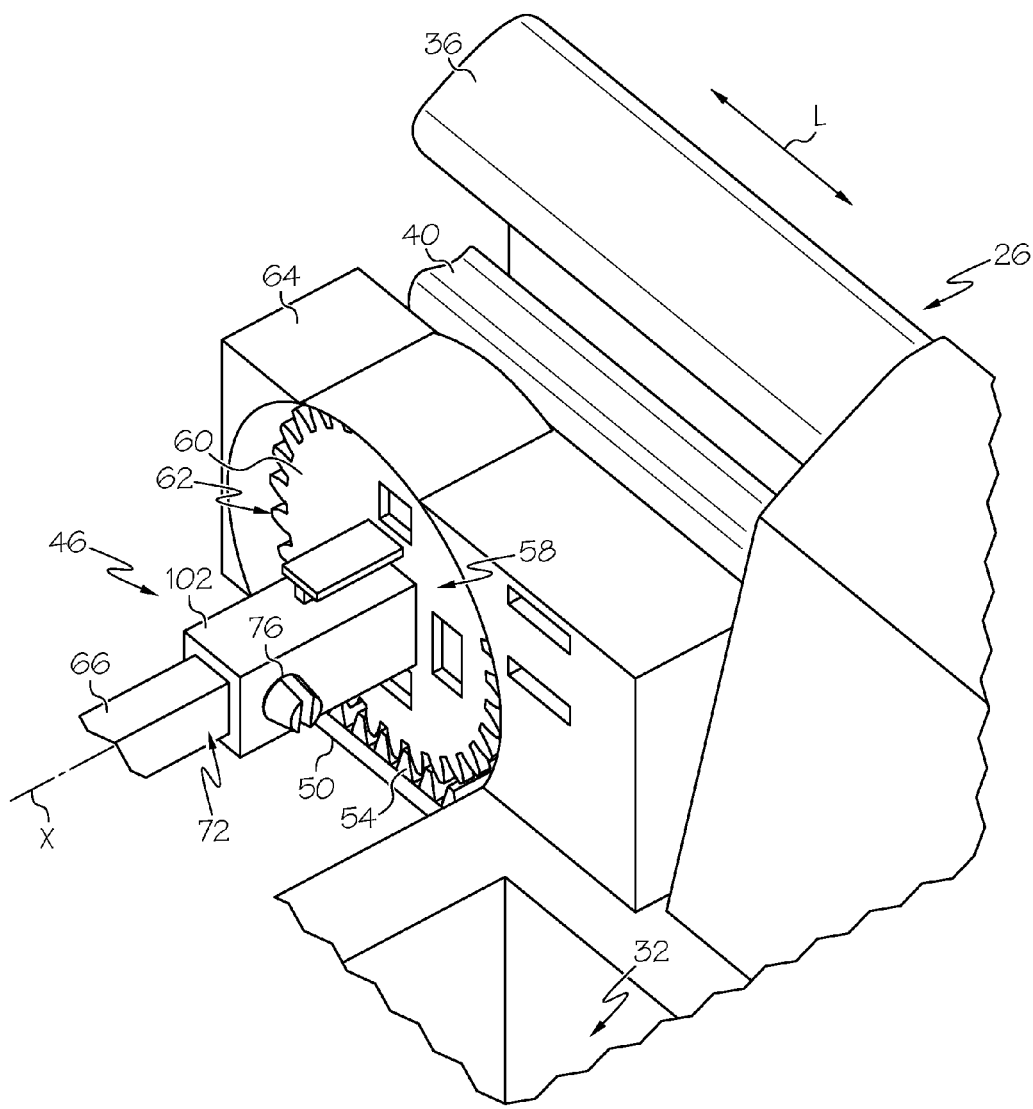
FIG. 3 is a close-up, front perspective view of a second end of the drawer assembly.

As shown in FIG. 1 and more closely in FIGS. 2 & 3, each motion control mechanism 26 can include a mounting bracket 36 for mounting the motion control mechanism 26 to the cabinet 10. In particular, one motion control mechanism 26 can be mounted to the left sidewall 16 and the other motion control mechanism 26 can be mounted to the right sidewall 18. Each motion control mechanism 26 can further include a linear motion element 40 coupled to its mounting bracket 36 that permits the drawer 24 to move relative to the mounting bracket 36 along the line of travel L. Each linear motion element 40 may be a slide mechanism comprising, for example, a plurality of elongate members that can slide relative to one another along the line of travel L. In particular, the elongate members may be telescoping members that have varying cross-sections and are housed within one another when the drawer 24 is in a retracted position. The cross-sectional shapes may vary and can comprise, for example, a "U" or "C" shape, an oval shape, etc. The linear motion of the elongate members may be enabled using plain bearings, such as dovetail slides, ball bearings, roller bearings, or other means known in the art.

In some examples, the elongate members for each linear motion element 40 may include a stationary member fixed to the mounting bracket 36 of their associated motion control mechanism 26 and a moving member that moves relative to the stationary member to move between a retracted position and an extended position. Moreover, the elongate members in some examples may include one or more intermediate members linking the stationary member to the moving member such that the stationary member and the moving member correspond to the outermost portions of the linear motion element 40 in the extended position. The door 30 and/or basket 32 of the drawer 24 may be fixed to the moving member such that the door 30 and/or basket 32 move together with moving member between the retracted and extended position. Moreover, in some examples the basket 32 may be slidably coupled to the linear motion element 40 of each motion control mechanism 26 so that the basket 32 can slide back and forth along the linear motion elements 40 when they are extended.

The drawer assembly 22 further includes a rack-and-pinion assembly 46 that is configured to facilitate linear movement of the drawer 24 and help both of the linear motion elements 40 of the motion control mechanisms 26 advance and retract substantially equally on each side of the drawer assembly 22. In particular, the rack-and-pinion assembly 46 can comprise a first rack 48 and a second rack 50 that each comprise a plurality of rack teeth 54 provided longitudinally therealong. The rack-and-pinion assembly 46 can further comprise a first pinion 56 and a second pinion 58 that are respectively engaged with the first and second racks 48, 50. More specifically, each of the first and second pinions 56, 58 can include a generally circular gear body 60 and a plurality of pinion teeth 62 provided circumferentially about the gear body 60. The first and second pinions 56, 58 can be arranged relative to the first and second racks 48, 50 such that the pinion teeth 62 of the first and second pinions 56, 58 engage (e.g., mesh with) the rack teeth 54 of the first and second racks 48, 50. In the illustrated embodiment, the racks 48, 50 and pinions 56, 58 are arranged such that the rack teeth 54 are oriented upward along the top of the racks 48, 50 and the pinions 56, 58 are located above the racks 48, 50. However, in other examples the racks 48, 50 and pinions 56, 58 may be arranged such that the rack teeth 54 are oriented downward along the bottom of the racks 48, 50 and the pinions 56, 58 are located below the racks 48, 50. Preferably, the first and second pinions 56, 58 are arranged such that the pinions 56, 58 are coaxial and rotatable about a common rotational axis X that is substantially perpendicular to the line of travel L for the drawer 24.

The first rack 48 can be fixedly coupled to the mounting bracket 36 of the left motion control mechanism 26 and the second rack 50 can be fixedly coupled to the mounting bracket 36 of the right motion control mechanism 26. Alternatively, the racks 48, 50 can be fixedly coupled directly to the sidewalls 16, 18 or some other portion of the cabinet 10 or the motion control mechanisms 26. Meanwhile, the pinions 56, 58 can be rotatably coupled to the drawer 24 such that the pinions 56, 58 will move with the drawer 24 as the drawer 24 is moved in and out of the enclosure 12. For example, each pinion 56, 58 may be rotatably coupled to and surrounded by a housing 64 that is fixed to the basket 32. As the drawer 24 is moved in and out of the enclosure 12, the pinions 56, 58 will move with the basket 32 and translate along the racks 48, 50 in a direction parallel to the line of travel L for the drawer 24. The rotational axis X of the pinions 56, 58 will likewise translate (e.g., shift sideways) with the basket 32 in a direction parallel to the line of travel L. Moreover, the engagement of the pinions 56, 58 with the racks 48, 50 will cause the pinions 56, 58 to rotate about the rotational axis X relative to the basket 32 and the racks 48, 50 as the rotational axis X translates with the basket 32.

The engagement of the pinions 56, 58 with the racks 48, 50 will help keep the drawer assembly 22 aligned such that the linear motion elements 40 of the motion control mechanisms 26 will advance and retract substantially equally on each side of the drawer assembly 22. However, a situation may arise wherein the pinions 56, 58 do not rotate simultaneously or do not rotate the same amount, which can cause misalignment of the drawer 24. To prevent such instances, the rack-and-pinion assembly 46 can comprise a timing bar 66 that is configured to help synchronize rotation of the first and second pinions 56, 58.

The timing bar 66 can be an elongated member that is aligned with the rotational axis X of the pinions 56, 58 and comprises a first end 70 and a second end 72. The timing bar 66 in the present example is a solid bar comprising a square cross-section (taken along a plane parallel to the sidewalls 16, 18). A timing bar 66 made of a rigid material (e.g., metal or plastic) that is formed as a solid bar will increase stability of the rotational system. However, the timing bar 66 in other examples can be hollow and/or comprise a different shaped cross-section such as, for example, a circular cross-section. As will be described in further detail below, the timing bar 66 can be coupled at its ends 70, 72 to the first and second pinions 56, 58 to facilitate synchronous rotation of the timing bar 66 and the pinions 56, 58.

Figure 4:
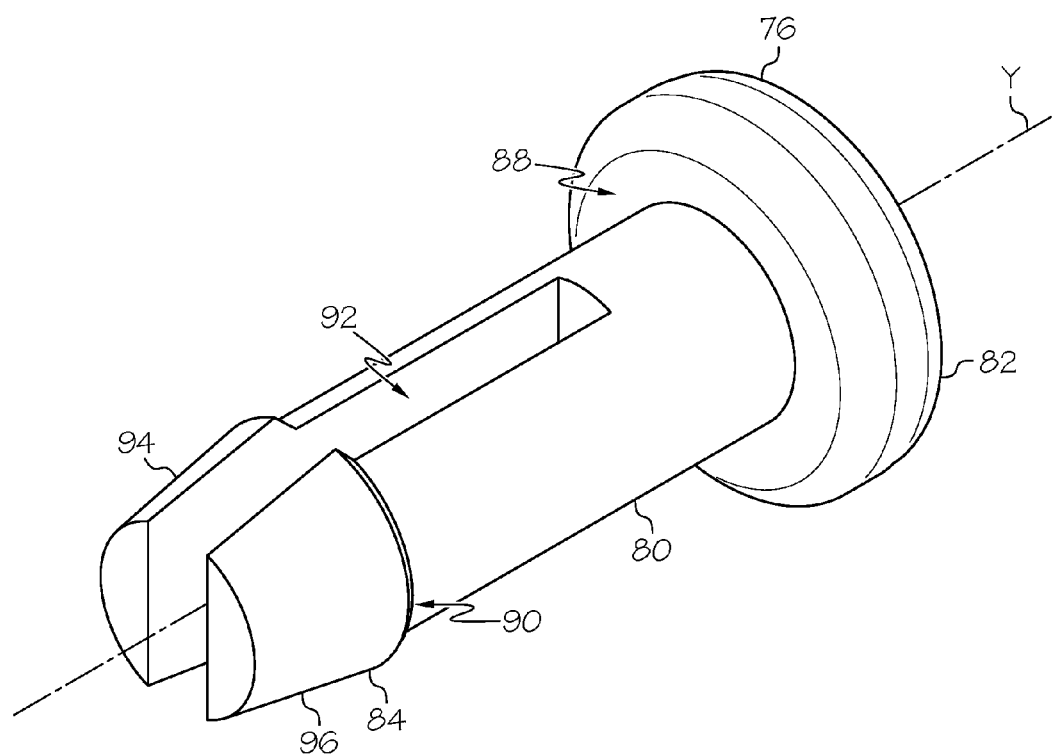
FIG. 4 is a perspective view of a pin that can be used in the drawer assembly.

Turning now to FIG. 4, an example pin 76 is illustrated that can be used to couple the first and second ends 70, 72 of the timing bar 66 to the first and second pinions 56, 58. The pin 76 is a non-threaded, elongated body comprising a shaft 80, a head 82 provided at one end of the shaft 80, and a frustoconical member 84 provided at the other end of the shaft 80. The shaft 80 defines a pin axis Y that extends longitudinally through the shaft 80. The shaft 80 can be a cylindrical member comprising a circular cross-section (taken along a plane perpendicular to the pin axis Y) or the shaft 80 can comprise other geometries having, for example, a tubular and/or square cross-section. The shaft 80 can comprise a variety of elongated configurations that define the pin axis Y.

The head 82 and the frustoconical member 84 are preferably configured so that the portions of the head 82 and the frustoconical member 84 immediately adjacent/connected to the shaft 80 are larger in width than the shaft 80 (width being measured perpendicular to the pin axis Y). For example, the head 82 can comprise an annular surface 88 that extends radially outward from the shaft 80 about the pin axis Y such that the annular surface 88 will have a larger outer diameter than the shaft 80. Likewise, the frustoconical member 84 can comprise an annular surface 90 that faces the annular surface 88 of the head 82 and extends radially outward from the shaft 80 about the pin axis Y such that the annular surface 90 of the frustoconical member 84 will have a larger outer diameter than the shaft 80. Preferably, the frustoconical member 84 is aligned with and tapered along the pin axis Y such that the diameter (measured perpendicular to the pin axis Y) of the frustoconical member 84 increases along the pin axis Y in a direction toward a center of the pin 76.

In some examples, the pin 76 can further comprise a longitudinal slot 92 that extends along its pin axis Y through its frustoconical member 84 and at least partially through its shaft 80, thereby bisecting the frustoconical member 84 and at least part of the shaft 80 to define a first arm 94 and a second arm 96 that extend along the pin axis Y. Preferably, the pin 76 can comprise a flexible material so that the first and second arms 94, 96 can resiliently deflect towards each other. For example, in some embodiments the pin 76 can comprise metal, hard rubber, or various plastics, such as at least one of polyvinyl chloride, thermoplastic elastomer, polyolefin plastomer, and thermoplastic polyester. However, other materials are possible in other embodiments.

It is to be appreciated that the pin 76 illustrated in FIG. 4 is only one example configuration. The pin 76 may comprise a variety of different configurations without departing from the scope of the disclosure. For example, in some embodiments the pin 76 may simply consist of a cylindrical shaft that is press-fit into the desired hole, or that includes other retaining structure. The pin 76 can be any elongated body that defines a pin axis. The frustoconical member 84 may exist on only one side of the shaft 80.

Turning to FIGS. 5-8, various configurations and assembly methods for the rack-and-pinion assembly 46 will now be described that use the above-described pin 76 to couple the timing bar 66 to the first and second pinions 56, 58 and facilitate synchronous rotation of the timing bar 66 and pinions 56, 58. In each example, the timing bar 66 can be slidably attached to the pinions 56, 58 and fixed thereto by inserting a first pin 76 into at least one of the first pinion 56 and the timing bar 66, and a second pin 76 into at least one of the second pinion 58 and the timing bar 66, thereby substantially inhibiting translational movement of the timing bar 66 both along and about the rotational axis X relative to the pinions 56, 58.

Figure 5:
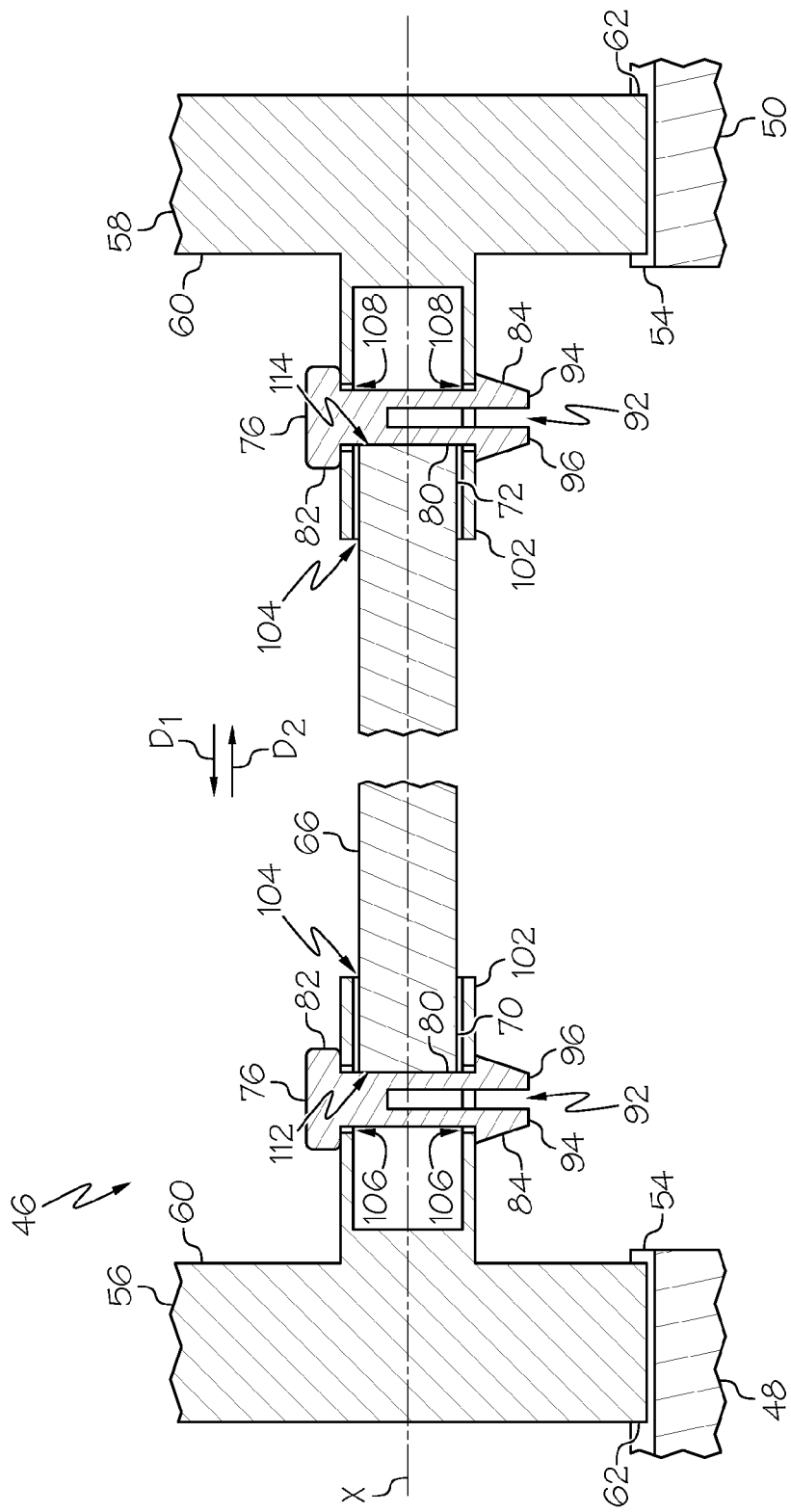
FIG. 5 is a cross-sectional view of a rack-and-pinion assembly for the drawer assembly according to one configuration.
Figure 6:
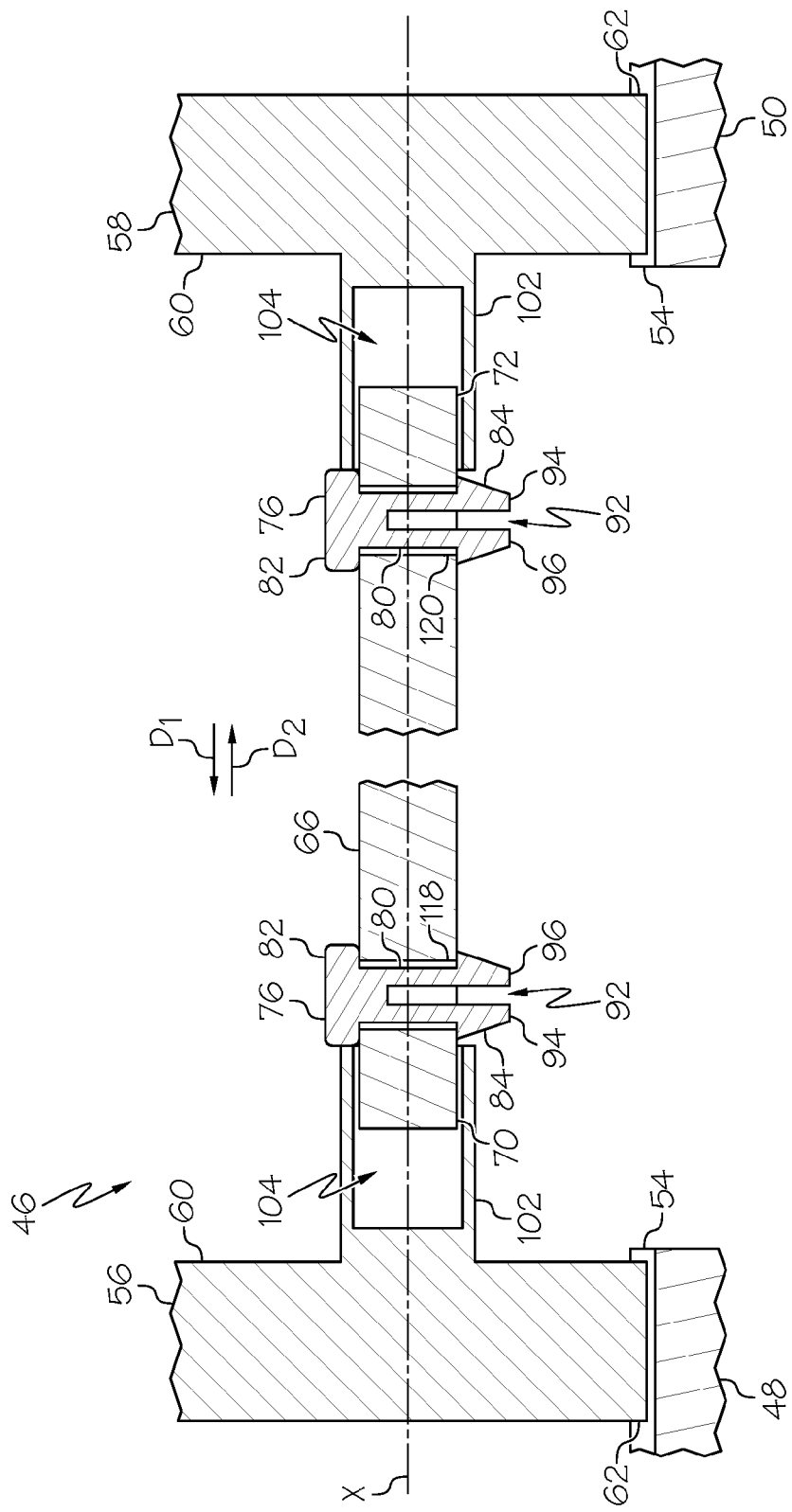
FIG. 6 is a cross-sectional view of the rack-and-pinion assembly according to another configuration.

For instance, two example configurations are shown in FIGS. 5 & 6 wherein each of the first and second pinions 56, 58 comprises a sleeve 102 coupled (e.g., integrally formed with or separately attached) to its gear body 60. Each sleeve 102 defines a bore 104 that is configured (e.g., sized and shaped) to slidably receive one of the ends 70, 72 of the timing bar 66. The bore 104 of each sleeve 102 has a cross-sectional area similar to, and preferably slightly larger than, the cross-sectional area of the ends 70, 72 of the timing bar 66 to provide a relatively snug fit therebetween. The pinions 56, 58 are arranged such that their sleeves 102 extend inward from the respective gear bodies 60 toward the center of the enclosure 12. Moreover, the sleeves 102 of the pinions 56, 58 are arranged such their bores 104 are coaxial with the rotational axis X.

For the configurations shown in FIGS. 5 & 6, the timing bar 66 can be slidably coupled to the pinions 56, 58 by inserting its first and second ends 70, 72 respectively into the bores 104 of the first and second pinions 56, 58. For example, the first end 70 of the timing bar 66 can be inserted into the bore 104 of the first pinion 56 to slidably couple the first end 70 of the timing bar 66 to the first pinion 56. The first end 70 of the timing bar 66 can then be slid along the rotational axis X (relative to the sleeve 102 of the first pinion 56) in a first direction $D_1$ (e.g., away from the second pinion 58) until spacing is provided between the second end 72 of the timing bar 66 and the sleeve 102 of the second pinion 58 along the rotational axis X. In some cases, the timing bar 66 will be slid in the first direction $D_1$ until the first end 70 of the timing bar 66 reaches and contacts the end of the bore 104 of the first pinion 56. The timing bar 66 can then be slid along the rotational axis X (relative to the sleeve 102 of the first pinion 56) in a second direction $D_2$ (e.g., toward the second pinion 58) until the second end 72 of the timing bar 66 is received within the bore 104 of the second pinion 58, thereby slidably coupling the second end 72 of the timing bar 66 with the second pinion 58. In another example, the second end 72 of the timing bar 66 can be inserted into the bore 104 of the second pinion 58 and then slid along the rotational axis X in the second direction $D_2$ until spacing is provided between the first end 70 of the timing bar 66 and the sleeve 102 of the first pinion 56 along the rotational axis X. The timing bar 66 can then be slid along the rotational axis X in the first direction $D_1$ until the first end 70 of the timing bar 66 is received within the bore 104 of the first pinion 56, thereby slidably coupling the first end 70 of the timing bar 66 with the first pinion 56.

The timing bar 66 in FIGS. 5 & 6 can be further fixed against translational movement along the rotational axis X relative to the pinions 56, 58 by inserting one or more pins 76 into apertures provided in the timing bar 66 and/or pinions 56, 58. For example, as shown in FIG. 5, the timing bar 66 can be positioned between a first set of apertures 106 in the sleeve 102 of the first pinion 56 and a second set of apertures 108 in the sleeve 102 of the second pinion 58. Moreover, one pin 76 can be inserted into and through the first set of apertures 106 of the first pinion 56 and another pin 76 can be inserted into and through the second set of apertures 108 of the second pinion 58. The order in which the timing bar 66 is positioned and the pins 76 are inserted can vary. In one example, the first end 70 of the timing bar 66 will be inserted into the bore 104 of the first pinion 56 and then slid in the first direction $D_1$ until spacing is provided between the second end 72 of the timing bar 66 and the sleeve 102 of the second pinion 58. A pin 76 can be inserted through the second set of apertures 108 of the second pinion 58 and the timing bar 66 can then be slid in the second direction $D_2$ until the second end 72 of the timing bar 66 is received within the bore 104 of the second pinion 58 and abuts the pin 76 inserted through the second pinion 58. Another pin 76 can then be inserted through the first set of apertures 106 of the first pinion 56. In this manner, the timing bar 66 is properly located and captured between the pins 76 to resist removal.

The pins 76 in FIG. 5 can be inserted until their respective head 82 and frustoconical member 84 abut opposing sides of their associated sleeves 102, thereby providing a snap-fit connection that fixes the pins 76 to the pinions 56, 58 and also inhibits removal of the pins 76. Preferably, the pinions 56, 58 will be spaced and the timing bar 66 will be sized such that upon insertion of the pins 76, the ends 70, 72 of the timing bar 66 will abut the pins 76. More specifically, a first end surface 112 of the timing bar 66 will abut the shaft 80 of the left pin 76 while a second end surface 114 of the timing bar 66 will abut the shaft 80 of the right pin 76. Thus, the left pin 76 will substantially inhibit movement of the timing bar 66 relative to the first pinion 56 in the first direction $D_1$ and the right pin 76 will substantially inhibit movement of the timing bar 66 relative to the second pinion 58 in the second direction $D_2$. As such, the timing bar 66 will be fixed along the rotational axis X relative to the first and second pinions 56, 58.

In the example shown in FIG. 6, the timing bar 66 can be fixed against translation along the rotational axis X relative to the pinions 56, 58 by positioning the timing bar 66 relative to the pinions 56, 58 such that a first aperture 118 and a second aperture 120 in the timing bar 66 are located between and adjacent to the sleeves 102 of the pinions 56, 58. Moreover, two pins 76 can be inserted into and through the first and second apertures 118, 120 until their respective head 82 and frustoconical member 84 abut opposing sides of the timing bar 66 via a snap-fit connection. The order in which the timing bar 66 is positioned and the pins 76 are inserted can vary. In one example, the first end 70 of the timing bar 66 will be inserted into the bore 104 of the first pinion 56 and then slid in the first direction $D_1$ until spacing is provided between the second end 72 of the timing bar 66 and the sleeve 102 of the second pinion 58. A pin 76 can be inserted through the second aperture 120 in the timing bar 66 and the timing bar 66 can then be slid in the second direction $D_2$ until the second end 72 of the timing bar 66 is received within the bore 104 of the second pinion 58 and the sleeve 102 of the second pinion 58 abuts the pin 76 inserted through the second aperture 120 of the timing bar 66. Another pin 76 can then be inserted through the first aperture 118 of the timing bar 66 so that the timing bar 66 is properly located and captured between the pins 76 and sleeves 102 to resist removal.

Preferably, the pinions 56, 58 and apertures 118, 120 in FIG. 6 will be spaced such that upon insertion of the two pins 76, the heads 82 and/or frustoconical members 84 of the pins 76 will abut the sleeves 102 of the pinions 56, 58. Thus, the left pin 76 will substantially inhibit movement of the timing bar 66 relative to the first pinion 56 in the first direction $D_1$ and the right pin 76 will substantially inhibit movement of the timing bar 66 relative to the second pinion 58 in the first direction $D_2$. As such, the timing bar 66 will be fixed along and about the rotational axis X relative to the first and second pinions 56, 58.

As described above, the timing bar 66 in FIGS. 5 & 6 can be fixed against translation along the rotational axis X by inserting a first pin 76 into one of the timing bar 66 and the sleeve 102 of the first pinion 56 and another pin 76 into one of the timing bar 66 and the sleeve 102 of the second pinion 58. Moreover, in some examples, a first pin 76 can be inserted into both the timing bar 66 and the first pinion 56 and a second pin 76 can be inserted into both the timing bar 66 and the second pinion 56. In such examples, the pins 76 will not only fix the timing bar 66 along the rotational axis X but will also fix the timing bar 66 about the rotational axis X relative to the pinions 56, 58 so that the timing bar 66 will rotate in unison with the pinions 56, 58. In addition or in alternative, the timing bar 66 and the sleeves 102 can be shaped to facilitate synchronous rotation of the timing bar 66 and the pinions 56, 58. More specifically, in some examples, the timing bar 66 can comprise a cross-sectional shape (taken along a plane perpendicular to the rotational axis X) that is non-circular and substantially matches the inner circumference of the sleeves 102 of the pinions 56, 58. For example, the timing bar 66 can comprise a cross-sectional shape that is square and the sleeves 102 can have a square-shaped bore 104 that substantially matches but is slightly larger than the square cross-section of the timing bar 66 (as shown in FIGS. 2 & 3). Because the shapes of the timing bar 66 and bores 104 are non-circular, rotation of the timing bar 66 will cause the pinions 56, 58 to rotate, and vice versa. However, there may be examples wherein the timing bar 66 and bores 104 comprise a non-circular shape other than a square shape. Moreover, there may be some examples wherein the timing bar 66 and bores 104 comprise a circular shape.

Figure 7:
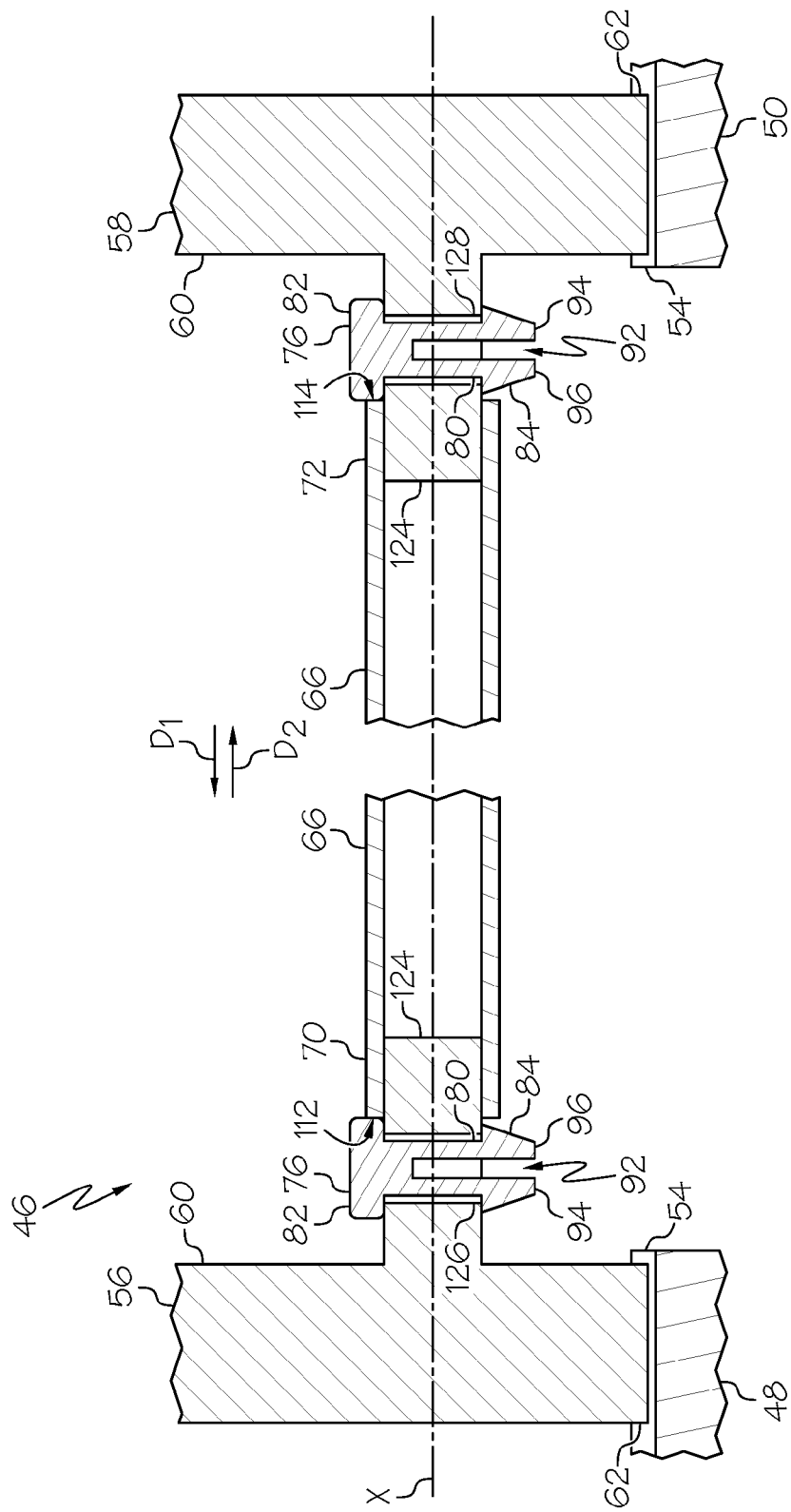
FIG. 7 is a cross-sectional view of the rack-and-pinion assembly according to yet another configuration.
Figure 8:
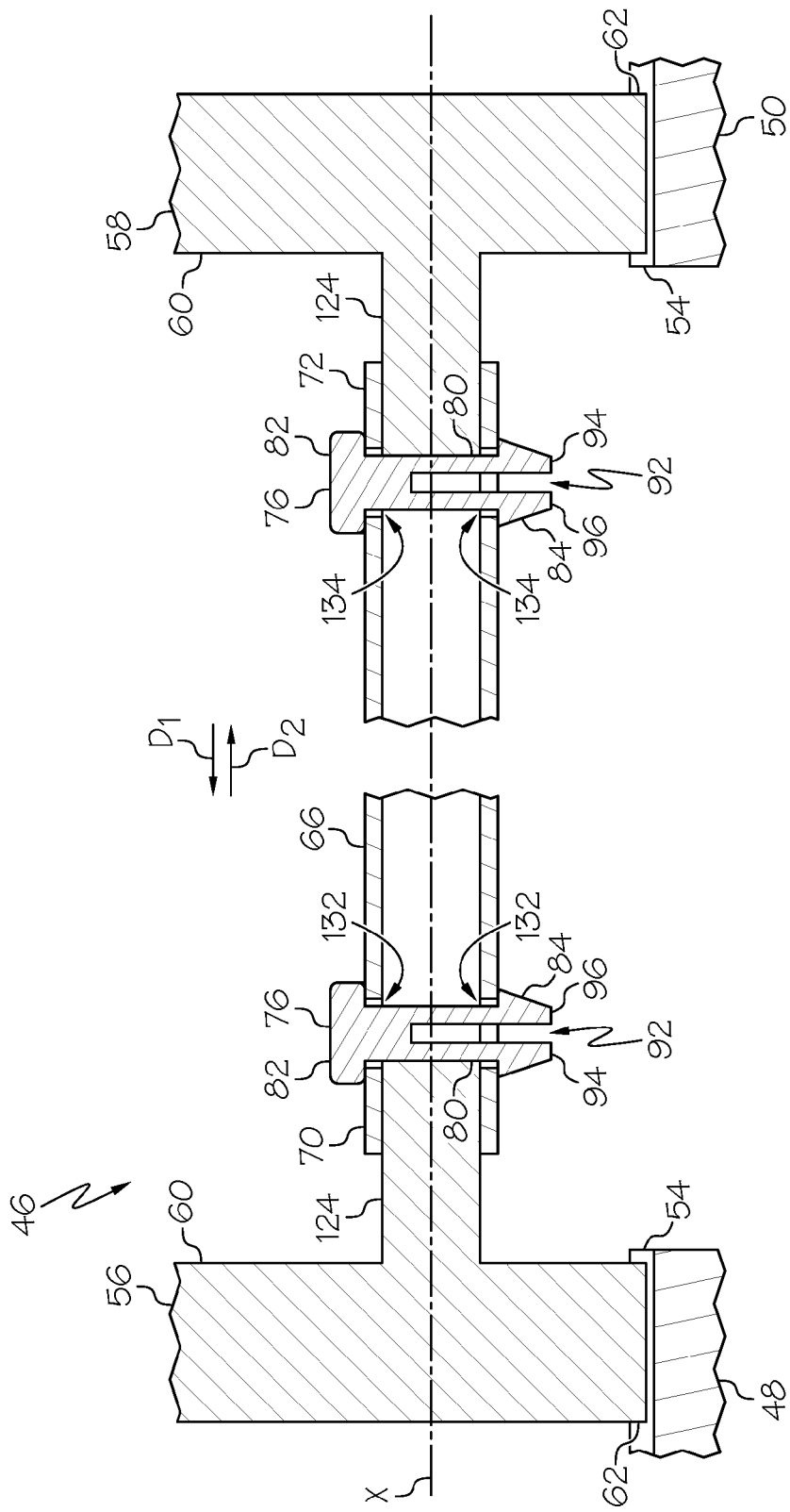
FIG. 8 is a cross-sectional view of the rack-and-pinion assembly according to still yet another configuration.

Turning now to FIGS. 7 & 8, two other configurations for the rack-and-pinion assembly 46 are shown wherein each of the first and second pinions 56, 58 comprises a projection 124 coupled (e.g., integrally formed with or separately attached) to its gear body 60. Moreover, the timing bar 66 is a hollow structure having an inner circumference that is configured (e.g., sized and shaped) to slidably receive the projections 124 of the pinions 56, 58. The cross-sectional area of each projection 124 is similar to, and preferably slightly smaller than, the cross-sectional area of the hollow ends 70, 72 of the timing bar 66 to provide a relatively snug fit therebetween. The pinions 56, 58 are arranged such that their projections 124 extend inward from the respective gear bodies 60 toward the center of the enclosure 12. Moreover, the pinions 56, 58 are arranged such their projections 124 are coaxial with the rotational axis X. It is further contemplated that although illustrated as hollow along its entire length, the timing bar 66 could be a solid bar along some or even most of its length, with only hollow ends that interface with the projections 124.

For the configurations shown in FIGS. 7 & 8, the timing bar 66 can be slidably coupled to the pinions 56, 58 by sliding its first and second ends 70, 72 over the projections 124 of the first and second pinions 56, 58. For example, the first end 70 of the timing bar 66 can be slid over the projection 124 of the first pinion 56 to slidably couple the first end 70 of the timing bar 66 to the first pinion 56. The first end 70 of the timing bar 66 can then be slid in the first direction $D_1$ along the rotational axis X until spacing is provided between the second end 72 of the timing bar 66 and the projection 124 of the second pinion 58 along the rotational axis X. In some cases, the timing bar 66 will be slid in the first direction $D_1$ until the first end 70 of the timing bar 66 reaches and contacts the gear body 60 of the first pinion 56. The timing bar 66 can then be slid (relative to first pinion 56) in the second direction $D_2$ along the rotational axis X until the second end 72 of the timing bar 66 slides over the projection 124 of the second pinion 58, thereby slidably coupling the second end 72 of the timing bar 66 with the second pinion 58. In another example, the second end 72 of the timing bar 66 can be slid over the projection 124 of the second pinion 58 in the second direction $D_2$ until spacing is provided between the first end 70 of the timing bar 66 and the projection 124 of the first pinion 56. The timing bar 66 can then be slid in the first direction $D_1$ until the first end 70 of the timing bar 66 slides over the projection 124 of the first pinion 56, thereby slidably coupling the first end 70 of the timing bar 66 with the first pinion 56.

The timing bar 66 in FIGS. 7 & 8 can be fixed against translation along the rotational axis X relative to the pinions 56, 58 by inserting one or more pins 76 into apertures provided in the timing bar 66 and/or pinions 56, 58. For example, as shown in FIG. 7, the timing bar 66 can be positioned between a first aperture 126 in the projection 124 of the first pinion 56 and a second aperture 128 in the projection 124 of the second pinion 58. Moreover, two pins 76 can be inserted into and through the first and second apertures 126, 128 until their respective heads 82 and frustoconical members 84 abut opposing sides of their associated projections 124, thereby fixing the pins 76 to the pinions 56, 58. The order in which the timing bar 66 is positioned and the pins 76 are inserted can vary. In one example, the first end 70 of the timing bar 66 will be slid over the projection 124 of the first pinion 56 in the first direction $D_1$ until spacing is provided between the second end 72 of the timing bar 66 and the projection 124 of the second pinion 58. A pin 76 can be inserted through the second aperture 128 of the second pinion 58 and the timing bar 66 can then be slid in the second direction $D_2$ until the second end 72 of the timing bar 66 slides over the projection 124 of the second pinion 58 and abuts the pin 76 inserted through the second pinion 58. Another pin 76 can then be inserted through the first aperture 126 of the first pinion 56 so that the timing bar 66 is captured between the pins 76.

Preferably, the pinions 56, 58 in FIG. 7 will be spaced and the timing bar 66 will be sized such that upon insertion of the pins 76, the ends 70, 72 of the timing bar 66 will abut the pins 76. More specifically, the first end surface 112 of the timing bar 66 will abut the head 82 and/or frustoconical member 84 of the left pin 76 while a second end surface 114 of the timing bar 66 will abut the head 82 and/or frusto-conical member 84 of the right pin 76. Thus, the left pin 76 will substantially inhibit translational movement of the timing bar 66 relative to the first pinion 56 in the first direction $D_1$ and the right pin 76 will substantially inhibit movement of the timing bar 66 relative to the second pinion 58 in the second direction $D_2$. As such, the timing bar 66 will be fixed along the rotational axis X relative to the first and second pinions 56, 58.

In the example shown in FIG. 8, the timing bar 66 can be fixed against translation along the rotational axis X relative to the pinions 56, 58 by positioning the timing bar 66 such that a first set of apertures 132 and a second set of apertures 134 in the timing bar 66 are located between and adjacent to the projections 124 of the first and second pinions 56, 58. Moreover, two pins 76 can be inserted into and through the first and second sets of apertures 132, 134 until their respective heads 82 and frustoconical members 84 abut opposing sides of the timing bar 66. The order in which the timing bar 66 is positioned and the pins 76 are inserted can vary. In one example, the first end 70 of the timing bar 66 will be slid over the projection 124 of the first pinion 56 in the first direction $D_1$ until spacing is provided between the second end 72 of the timing bar 66 and the projection 124 of the second pinion 58. A pin 76 can be inserted through the second set of apertures 134 in the timing bar 66 and the timing bar 66 can then be slid in the second direction $D_2$ until the second end 72 of the timing bar 66 slides over the projection 124 of the second pinion 58 and the pin 76 inserted through the second set of apertures 134 of the timing bar 66 abuts the projection 124 of the second pinion 58. Another pin 76 can then be inserted through the first set of apertures 132 of the timing bar 66 is captured between the pins 76 and projections 124.

Preferably, the pinions 56, 58 and apertures 118, 120 in FIG. 8 will be spaced such that upon insertion of the two pins 76, the shafts 80 of the pins 76 will abut the projections 124 of the first and second pinions 56, 58. Thus, the left pin 76 will substantially inhibit translational movement of the timing bar 66 relative to the first pinion 56 in the first direction $D_1$ and the right pin 76 will substantially inhibit movement of the timing bar 66 relative to the second pinion 58 in the second direction $D_2$. As such, the timing bar 66 will be fixed along the rotational axis X relative to the first and second pinions 56, 58.

As described above, the timing bar 66 in FIGS. 7 & 8 can be fixed against translation along the rotational axis X by inserting a first pin 76 into one of the timing bar 66 and the projection 124 of the first pinion 56 and another pin 76 into one of the timing bar 66 and the projection 124 of the second pinion 58. Moreover, in some examples, a first pin 76 can be inserted into both the timing bar 66 and the first pinion 56 and a second pin 76 can be inserted into both the timing bar 66 and the second pinion 56. In such examples, the pins 76 will not only fix the timing bar 66 against translation along the rotational axis X but will also fix the timing bar 66 against rotation about the rotational axis X relative to the pinions 56, 58 so that the timing bar 66 will rotate in unison with the pinions 56, 58. In addition or in alternative, the timing bar 66 and the projections 124 can be shaped to facilitate synchronous rotation of the timing bar 66 and the pinions 56, 58. More specifically, in some examples, the projections 124 can comprise a cross-sectional shape (taken along a plane perpendicular to the rotational axis X) that is non-circular and substantially matches the inner circumference of the timing bar 66. For example, the projections 124 can comprise a cross-sectional shape that is square and the timing bar 66 can have a square-shaped inner circumference that substantially matches but is slightly larger than the square cross-section of the projections 124. Because the projections 124 and the inner circumference of the timing bar 66 are non-circular, rotation of the timing bar 66 will cause the pinions 56, 58 to rotate, and vice versa. However, there may be examples wherein the projections 124 and the inner circumference of the timing bar 66 comprise a non-circular shape other than a square shape. Moreover, there may be some examples wherein the projections 124 and the inner circumference of the timing bar 66 comprise a circular shape.

The pin 76 described above can be used in a variety of ways to substantially inhibit movement of the timing bar 66 relative to the first and second pinions 56, 58 along and about the rotational axis X. In particular, the non-threaded design of the pin 76 can permit a quick and easy assembly of the rack- and pinion assembly 46 by permitting the pin 76 to be inserted through apertures in the timing bar 66 and/or pinions 56, 58 without the use of a tool (e.g., screwdriver). Moreover, the shape of the frustoconical member 84 of the pin 76 can facilitate insertion of the pin 76 through an aperture since the end of the frustoconical member 84 leading into an aperture during insertion will have a smaller diameter. Furthermore, the longitudinal slot 92 of the pin 76 will also facilitate insertion by permitting the arms 94, 96 of the pin 76 to flex inward during insertion. Additionally, the pin 76 can be readily removed to disassemble the timing bar system for repair or service by squeezing the first and second arms 94, 96 together so that the end 84 has a reduced size that can pass through the associated aperture.

It is to be appreciated that while the above-described pin 76 can be used to substantially inhibit movement of the timing bar 66 relative to the first and second pinions 56, 58 along and about the rotational axis X, some movement between the timing bar 66 and the pinions 56, 58 may be possible due to manufacturing tolerances of apertures, projections, bores, timing bar length etc. For example, although various embodiments have been described above wherein the timing bar 66 or pinions 56, 58 abut (e.g., contact) first and second pins 76 to substantially inhibit movement of the timing bar 66 relative to the first and second pinions 56, 58, there may be instances wherein due to manufacturing tolerances the timing bar 66 or pinions 56, 58 do not contact the pins 76 but rather will be slightly spaced from and immediately adjacent to the pins 76 with minimal clearance. In such cases, the pins 76 can still substantially inhibit movement of the timing bar 66 relative to the first and second pinions 56. Thus, for the purposes of this disclosure, it is to be understood that the term "abut" when describing two or more features (e.g., pins, timing bar, pinions, etc.) means that the features can contact or be immediately adjacent to each other with minimal clearance.

The invention has been described with reference to example embodiments described above. Modifications and alterations will occur to others upon a reading and understanding of this specification. Example embodiments incorporating one or more aspects described above are intended to include all such modifications and alterations insofar as they come within the scope of the appended claims.

What is claimed is:

1. A rack-and-pinion mechanism for a drawer assembly of an enclosure comprising:
   a first rack and a second rack, and rack teeth provided longitudinally along each of the first rack and second rack;
   a first pinion and a second pinion that are respectively engaged with the rack teeth of the first rack and second rack via pinion teeth provided circumferentially around the first pinion and second pinion,
   wherein the first pinion and second pinion are coaxially aligned and rotatable about a rotational axis that translates as the first pinion and second pinion are rotated and translate along the first rack and second rack;
   a timing bar having a first end coupled to the first pinion and a second end coupled to the second pinion;
   a first pin that is non-threaded and inserted into the first pinion; and
   a second pin that is non-threaded and inserted into the second pinion,
   wherein the first pin and second pin are configured to substantially inhibit translational movement of the timing bar along the rotational axis, relative to the first pinion and second pinion,
   wherein each of the first pinion and second pinion comprises a gear body and a sleeve coupled to the gear body, the sleeve defining a bore that is coaxial with the rotational axis,
   further wherein the first end of the timing bar is inserted into the bore of the first pinion and the second end of the timing bar is inserted into the bore of the second pinion, and
   wherein the first pin is inserted through the sleeve of the first pinion and the second pin is inserted through the sleeve of the second pinion,
   further wherein the first pin abuts a first end surface of the timing bar and the second pin abuts a second end surface of the timing bar, the first end surface and second end surface facing opposite directions and extending perpendicular to the rotational axis.

2. The rack-and-pinion mechanism of claim 1, wherein the first pin substantially inhibits movement of the timing bar relative to the first pinion in a first direction along the rotational axis,
   further wherein the second pin substantially inhibits movement of the timing bar relative to the second pinion in a second direction along the rotational axis that is opposite the first direction.

3. A rack-and-pinion mechanism for a drawer assembly of an enclosure comprising:
   a first rack and a second rack, and rack teeth provided longitudinally along each of the first rack and second rack;
   a first pinion and a second pinion that are respectively engaged with the rack teeth of the first rack and second rack via pinion teeth provided circumferentially around the first pinion and second pinion,
   wherein the first pinion and second pinion are coaxially aligned and rotatable about a rotational axis that translates as the first pinion and second pinion are rotated and translate along the first rack and second rack;
   a timing bar having a first end coupled to the first pinion and a second end coupled to the second pinion;
   a first pin that is non-threaded and inserted into the first pinion; and
   a second pin that is non-threaded and inserted into the second pinion,
   wherein the first pin and second pin are configured to substantially inhibit translational movement of the timing bar along the rotational axis, relative to the first pinion and second pinion,
   wherein the first pin and second pin each comprise:
   a shaft defining a pin axis,
   a head provided at one end of the shaft, and
   a frustoconical member provided at the other end of the shaft, the frustoconical member being aligned with and tapered along the pin axis such that a diameter of the frustoconical member, measured perpendicular to the pin axis, increases along the pin axis in a direction toward a center of the pin.

4. The rack-and-pinion mechanism of claim 3, wherein the first pin and the second pin each further comprises a longitudinal slot that extends along its pin axis through its frustoconical member and at least partially through its shaft.

5. The rack-and-pinion mechanism of claim 3, wherein the head comprises a first surface that extends radially outward from the shaft about the pin axis and the frustoconical member comprises a second surface that faces the first surface and extends radially outward from the shaft about the pin axis.

* * * * *